United States Patent [19]

Janoski

[11] Patent Number: 5,008,311

[45] Date of Patent: Apr. 16, 1991

[54] SUBSTANTIALLY SOLVENT FREE ASPHALTIC AND METHOD RELATING THERETO

[75] Inventor: Ronald J. Janoski, Chagrin Falls, Ohio

[73] Assignee: Tremco Incorporated, Cleveland, Ohio

[21] Appl. No.: 324,932

[22] Filed: Mar. 17, 1989

[51] Int. Cl.$^5$ .................... C08L 95/00; C08L 75/08
[52] U.S. Cl. .................... 524/59; 524/287; 524/705
[58] Field of Search .............. 524/705, 59, 287; 428/543

[56] References Cited

U.S. PATENT DOCUMENTS

| | | | |
|---|---|---|---|
| 1,995,957 | 3/1935 | Barrett | 524/59 |
| 3,179,610 | 4/1965 | Wood | 524/705 |
| 3,637,558 | 1/1972 | Verdol et al. | 524/705 |
| 4,153,592 | 5/1979 | Burroway et al. | 428/543 |
| 4,338,243 | 7/1982 | Hecht et al. | 524/287 |

FOREIGN PATENT DOCUMENTS

| | | | |
|---|---|---|---|
| 720855 | 11/1965 | Canada | 524/59 |
| 2418507 | 4/1974 | Fed. Rep. of Germany | 524/59 |
| 0587725 | 1/1980 | U.S.S.R. | 524/705 |

*Primary Examiner*—Allan M. Lieberman
*Attorney, Agent, or Firm*—Konrad H. Kaeding

[57] ABSTRACT

The present invention relates to a compatibalizing agent useful in compatibalizing a substantially non-polar compound, such as asphalt, with a substantially polar organic compound, such as an isocyanate prepolymer. The compatibalizing agent consisting of a polymer unit, or of two such units being either identical or different linked together by an ester, carbon or ether bond, said unit having the following formula:

$$CH_3-(C_nH_{2n})-R_1$$

wherein:
n is 4 or more, and
$R_1$ is COOH, COO$^-$M$^+$, COOR$_2$ or R$_2$,
wherein:
M is a metal, and
$R_2$ is a substantially saturated organic chain having a backbone substantially comprising carbon-carbon, carbon-oxygen, or carbon-nitrogen linkages, or combinations thereof, wherein the backbone's pendent constituents are either —H or —OH and wherein at least one pendent constituent is —OH.

5 Claims, No Drawings

SUBSTANTIALLY SOLVENT FREE ASPHALTIC AND METHOD RELATING THERETO

BACKGROUND OF THE INVENTION

1. Field Of The Invention

The present invention relates to substantially solvent-free asphalt-based materials. More specifically, the present invention is directed to the use of fatty acids and derivatives thereof to substantially eliminate the need for solvent in asphaltic adhesives, sealants and the like.

2. Discussion Of The Prior Art

Asphalt is a dark, cementitious material having a solid or semi-solid consistency. It occurs naturally or as a petroleum derivative and is generally composed primarily of bitumens—generally paraffinic and aromatic hydrocarbons and heterocyclic compounds containing sulfur, nitrogen, and oxygen.

Asphalt is relatively inexpensive and has a relatively high penetration value when applied to most porous surfaces. Furthermore, asphalt is relatively weather resistant and water impermeable. As a result, asphalts have traditionally been used as protective films, adhesives, binders, and the like.

Asphalt can be used in a variety of forms, such as blends or emulsions, and can be processed by a variety of known techniques. Consequently, a large variety of asphalt based products can be found on the market, and are used in: paving; roofing; joint sealing; specialty paints; electrical laminates; hot melt adhesives; low-grade rubber product dilutents; radioactive waste disposal dilutents; hot-dip coatings; and water retention barriers.

A class of asphalt compounds are known generally which flow or are otherwise easily spread over a surface and which cure to a rubbery, elastomeric consistency. Such asphalt compounds, particularly cold applied asphalt compound, required the use of solvents to keep the asphalt component intermixed with other required components, such as elastomeric polymers, prepolymers and/or the like. Examples of other such required components would include isocyanate, styrene-butadiene and/or polybutadiene based elastomers and prepolymers thereof.

To aid in the mixing of asphalt with other otherwise non-miscible compounds, organic solvents have generally been used, such as toluene, aromatic oils, naptha, mineral spirits or carbon disulfide. Such solvents will suspend the asphalt into a dispersion and allow the other components to intermix with the asphalt. After mixing, the mixture can be easily applied by conventional technology. Thereafter, the solvent will evaporate off, leaving the asphalt properly intermixed with the other constituents.

However, solvent systems are being criticized by environmentalists and environmental government agencies. Solvents used in asphalt systems are generally deemed harmful to the environment if present above certain levels. Furthermore, persons handling the asphalt system risk exposure to these potentially harmful solvents. As a result, government regulations have become increasingly restrictive concerning volatile organic content ("VOC") of materials.

Solvent in asphaltic compounds can also cause other problems, such as an undesirable increase in viscosity, particularly at lower temperatures (indeed, many asphaltic systems cannot be applied much below 20° C).

High viscosity can also make an adhesive difficult to pour, pump or apply.

Yet another problem with solvent based adhesives is the potential for blister formation, particularly when a second coating is placed over the solvent based adhesive. If too little solvent is able to escape, the solvent vapors can accumulate and cause the coating to blister. On the other hand if the solvent is able to escape too freely, the adhesive may "dry up", pull away, or crack due to the rapid loss of solvent.

Furthermore solvents can increase the cost of the adhesive, due to increased shipping costs, handling costs and the like. Such solvents can also increase the flammability of the substance, and may cause unwanted side reactions.

Moreover, many solvent based systems provide poor green strength—that is, they are not sufficiently tacky (due to the presence of solvent) to provide adequate bonding and/or adhesion immediately upon application and prior to complete or substantial curing. Without substantial green strength, clamps, supports and the like must be used substantially during the time the material cures.

As a result, a tremendous need exists and has existed for many years for solvent-free asphaltic systems. Substantial research has been done in the industry to find a way to eliminate the need for asphalt solvents. However, for one reason or another, the industry has had to continue using asphalt solvents, much to the consternation of numerous government agencies, environmentalists and other concerned citizens.

OBJECTS OF THE INVENTION

It is an object of the present invention to provide a means for creating substantially solvent-free asphaltic adhesives, sealants and the like.

A further object of the present invention is to provide a solvent-free, cold applied insulation adhesive for concrete decks, roof assemblies and the like.

Other objects and features of the present invention will become apparent to those of ordinary skill in the art upon further reading of this specification.

SUMMARY OF THE INVENTION

The present invention relates to a compatibalizing agent useful in compatibalizing a substantially non-polar compound, such as asphalt, with a substantially polar organic compound, such as an isocyanate prepolymer. The compatibalizing agent consists of a polymer unit, or of two such units being either identical or different linked together by an ester, carbon or ether bond, said unit having the following formula:

$$CH_3-(C_nH_{2n})-R_1$$

wherein:
  n is 4 or more, preferrably 16 or more, and
  $R_1$ is COOH, COO$^-$M$^+$, COOR$_2$ or R$_2$,
  preferrably COOR$_2$, wherein:
    M is a metal, preferrably zinc, and
    $R_2$ is a substantially saturated organic chain having a backbone substantially comprising carbon-carbon, carbon-oxygen, or carbon-nitrogen linkages, or combinations thereof, wherein the backbone's pendent constituents are either —H or —OH and wherein at least one pendent constituent is —OH.

DETAILED DESCRIPTION OF THE PREFERRED EMBODIMENT

Introduction

The preferred elastomeric asphalt compound of the present invention comprises an asphalt (bitumen) component, an isocyanate prepolymer component, and a non-volatile compatibalizer component. The asphaltic component is used primarily due to its low cost, high penetration value and/or waterproof and weather resistance properties. The isocyanate prepolymer component is primarily present to polymerize within the asphalt subsequent to application, thereby providing a polymer network within the asphalt which provides strength and cohesion (the polymer network preferably contains urethane groups which also provide desirable elastomeric properties). The compatibalizer is used to promote intermixing of the pre-polymer and the asphalt.

The Asphaltic Component

The asphalt or bitumen component of this invention can be any commercially available asphalt common to the industry. Preferably, the asphalt is substantially free of water and is substantially free of heterocyclic compounds or compounds which have reactive sites which will react with isocyanates or polyols. The most preferred asphalt has a high paraffinic hydrocarbon content.

It has also been found that asphalts with low softening points, such as less than about 350° F. and preferably about 200° F. or less, generally work better in the present invention than asphalts with higher softening points. The lower softening points generally provide easier intermixing with the prepolymer when using the compatibalizer of this invention than asphalts with higher softening points. Furthermore, the elastomeric and sealing properties are often better. However the desired properties of an asphaltic end-product are largely dependent upon the end-use of the final product, and therefore depending upon the use, asphalts having high softening points may indeed be adequate or perhaps even preferred. The most preferred softening point for any particular application can be determined by conventional experimentation using ordinary skill.

A plasticizer or other non-reactive dilutent is preferably added to the asphalt component to further soften the asphalt, making it easier to intermix with the prepolymer component. Preferred plasticizers include dibutoxyethyl phthalate ("DBEP"), diisodecyl phthalate ("DIDP"), dibutyl phthalate ("DBP"), butyl benzyl phthalate ("BBP"), dioctyl phthalate ("DOP"), dioctyl sebacate ("DOS"), dioctyl adipate ("DOA"), diethyl butyl sebacate ("DEBS"), dibutoxyethyl glutarate, didecyl glutarate, diisodecyl glutarate, tricresyl phosphate, tributyl phosphate, and still bottom phosphate plasticizers. Phthalic derivative plasticizers are more preferred, and butyl benzyl phthalate is most preferred.

The asphalt component can sometimes contain reactive sites which will react with isocyanates (or prepolymers thereof), such as: sulfhydryl (—SH), imino (—NH$_2$), substituted amino (—NHR), carbonamide (—CONH$_2$), substituted carbonamide (—CONHR), sulfonamide (—SO$_2$NH$_2$), substituted sulfonamide (—SO$_2$NHR), thioamide (—SHNH$_2$), and sulfonic (—SO$_2$OH) functional groups. Such reactive sites can be detrimental to the preferred embodiment of the present invention, particularly in a one component version of the present invention (one and two component systems are discussed below in the section entitled "Curing").

Therefore, to prevent unwanted reaction between these asphalt reactive sites and the isocyanates (or prepolymers thereof), the asphalt should first be pretreated with a blocking group, such as a reactive isocyanate (such as a para-toluene-sulfonyl isocyanate or the like), anhydride or carbodiamide. The preferred blocking group is an anhydride, such as phthalic anhydride, succinic anhydride, or maleic anhydride. The anhydride will also dispose of any water within the asphalt, and water has been found generally to also be detrimental to the preferred embodiment of the present invention. The preferred amount of blocking group to be added to the asphalt is about 0.1 to about 5 weight percent, although the optimal amount of the blocking group can depend upon the particular end-use of the material and therefore may have to be determined by ordinary experimentation.

The Isocyanate Prepolymer Component

A second component of the preferred embodiment of the present invention is a polyisocyanate prepolymer. This polyisocyanate prepolymer is formed from the reaction of an organic polyisocyanate, preferably a diisocyanate, and an organic polyol. The hydroxyl group of the polyol will react with the isocyanate group of the polyisocyanate, and the resulting addition reaction will link the polyol to the polyisocyanate, creating a urethane at the junction of the previously separate molecules. The basic reaction of the diisocyante with the alcohol is a hydrogen exchange, where the hydrogen of the alcohol attaches itself to the carbon of the isocyanate, and conversely, the hydrogen of the isocyanate becomes attached to the alcohol oxygen, becoming a urethane.

However the isocyanate functional groups are preferably in substantial excess, and therefore, the polyol molecules will add to the polyisocyanate molecules until the polyol molecules are substantially or completely depleted, and the resulting (prepolymer) molecules will have unreacted polyisocyanate functional groups. The resulting molecules preferably have about 1 to about 10 isocyanate functional groups per molecule.

The prepolymer therefore contains rather large molecules having isocyanate functional groups. The functional groups will be reaction sites during curing. Curing is discussed below under the section heading "Curing."

Virtually any polyisocyanate can be used, including for example methylene di-para-phenylene isocyanate ("MDI"), toluene diisocyanate, polymethylene-polyphenylene-diisocyanate, isophorone diisocyanate, and mixtures thereof. Triisocyanates and higher polyisocyanates also work well. The most preferred polyisocyanates are aromatic polyisocyanates, such as MDI.

Suitable polyols (for reacting with the polyisocyanate to thereby form the polyisocyanate prepolymer) preferably have urethane or urea forming constituents, such as polyether polyols and less preferably polyester polyols, including diols and triols such as glycerine or glycerol. However, acrylated polyols do not work well in the present invention. Suitable polyols include ethylene glycol, propylene glycol, diethylene glycol, polybutadiene polyols, polytetrahydrofuran polyols, and polycarbonate polyols, and caprolactone-based polyols. Such polyols can be reacted with an alkylene oxide including ethylene oxide, propylene oxide and butylene oxide for example, to form polyether polyol adducts useful in forming the polyisocyanate prepolymer. The polyol can have a weight average molecular weight ranging from as low as about 250 to about 10,000 or more. Less preferred polyols are polyester polyols, since they have been found to be rather water sensitive and somewhat more temperature sensitive.

The polyisocyanate prepolymer also preferably contains one or more non-reactive dilutents, preferably plasticizers. These non-reactive dilutents advantageously modify (decrease) the viscosity of the material. The preferred non-reactive dilutents also typically make the end product less temperature sensitive, i.e., more durable when used at temperatures greater than about 150° F. Preferred plasticizers include dibutoxyethyl phthalate ("DBEP"), diisodecyl phthalate ("DIDP"), dibutyl phthalate ("DBP"), butyl benzyl phthalate ("BBP"), dioctyl phthalate ("DOP"), dioctyl sebacate ("DOS"), dioctyl adipate ("DOP") and diethyl butyl sebacate ("DEBS"), dibutoxyethoxyethyl sebacate, dibutoxyethyl sebacate, dibutyl sebacate, dioctyl dodecanedioate, diisooctyl dodecanedioate, dioctyl sebacate, dioctyl sebacate (substituted), triisooctyl trimellitate, trioctyl trimellitate, diisooctyl adipate, dioctyl adipate, dioctyl azelate, long chain alkyl alkylether diester, dialkyl diether glutarate, dibutoxyethoxyethyl glutarate, dibutoxyethyl glutarate, tributyl phosphate, and still bottom phosphate plasticizers. Phthalic derivative plasticizers are more preferred, and butyl benzyl phthalate is most preferred. The plasticizer softens the prepolymer and the asphalt, making them more fluid and therefore somewhat easier to intermix.

The amount of polyisocyanate prepolymer used in the present invention should be adequate to provide a coherent substantially homogeneous mass. Typically this will mean that the prepolymer is present in a weight percentage of about 20-90%, preferably about 50%.

The Compatibalizer

The third ingredient of the preferred embodiment of the present invention is a compatibalizer consisting of a polymer unit, or of two such units being either identical or different linked together by an ester, carbon or ether bond, said unit having the following formula:

$$CH_3-(C_nH_{2n})-R_1$$

wherein:

n is 4 or more, and $R_1$ is COOH, COO$^-$M$^+$, COOR$_2$ or R$_2$, preferably COOR$_2$, wherein:

M is a metal, preferably zinc, and

R$_2$ is a substantially saturated organic chain having a backbone substantially comprising carbon-carbon, carbon-oxygen, or carbon-nitrogen linkages, or combinations thereof, wherein the backbone's pendent constituents are either —H or —OH and wherein at least one pendent constituent is —OH. The most preferred compatibalizer is obtained where n is 12 or more, and R$_1$ is COOR$_2$.

The paraffinic portion of the polymer, $CH_3-(C_nH_{2n})-$, is very compatible with the asphalt. The longer the chain, the more compatible the molecule will be with asphalt, and therefore if the chain is relatively short, more compatibalizer molecules will generally be needed to suspend the asphalt.

The semi-polar portion of the polymer, —R$_1$, has been found to be very compatible with polyisocyanate prepolymer, plasitcizers and most additives used in asphalt systems which are substantially non-polar, but have polar-organic portions, such as urethane-type polarity. In the preferred embodiment, the hydroxyl contitutent(s) of the semi-polar portion of the polymer is very compatible with the urethane linkage of the prepolymer (or any other organic segment having a polarity substantially similar to urethane).

In the preferred embodiment, the hydroxyl group(s) will tend to move to the urethane linkage(s) and will tend to pull the compatibalizer in relative close proximity to the prepolymer molecule. In addition to the hydroxyl groups, the semi-polar portion of the preferred compatibalizer will also have hydrocarbon groups which are substantially non-polar and which are very compatible with the non-polar portion of the prepolymer.

As a result, the hydroxyl group will help suspend the urethane portion of the prepolymer, and the rest of the semi-polar portion of the prepolymer will help suspend the non-polar portion of the prepolmer, while the paraffinic portion of the compatibalizer will help suspend the asphalt component. As a result, the compatibalizer lifts the asphalt and prepolymer into suspension, enabling them to be thoroughly and easily intermixed.

Regarding the paraffinic portion of the compatibalizer, the flexibility of the paraffinic chain is important and aids in the compatibalizer's ability to suspend the asphalt. Therefore any double or triple bonds or the like would be detrimental to the paraffinic portion.

Furthermore, the non-polar character of the paraffinic chain is also very important. Modifications to the paraffinic chain will be detrimental to the compatibalizer, if they make the non-polarity less uniform. In general, even slight deviation from a pure paraffinic chain will substantially reduce asphalt compatibility.

The semi-polar portion of the compatibalizer however can be varied in a number of ways and is more difficult to define. As with the paraffinic portion, chain flexibility is also important. Chain flexibility aids in the compatibalizer's ability to suspend both the prepolymer and the asphalt.

Chain flexibility can be increase by substituting carbon-carbon bonds (in the semi-polar portion) with carbon-oxygen or carbon nitrogen linkages. The increased chain flexibility increases the compatibalizer's ability to suspend the prepolymer, but also effects its polarity. However, the semi-polar portion is designed to have a non-uniform polarity, and it has been found that modification to this non-uniform polarity generally do not substantially diminish compatibility. compatibalizer.

The prepolymer generally has numerous urethane linkages, as well as urea linkages and other components having some organic polarity. The polarity of the oxygen and nitrogen portions of the polymer backbone generally are very compatible with these portions of the prepolymer. As a result, although the semi-polar portion may be less able to suspend certain (non-polar) portions of the prepolmer due to the presence of oxygen of nitrogen, the increased chain flexibility enhances compatibility and the polarity due to the oxygen and nitrogen aids in suspending other polar portions of the prepolymer.

The ester linkage between the paraffinic portion and semi-polar portion has generally be found to be advantageous, although a precise explanation for this cannot be given. One explanation might be that the ester provides a stiff link between two very flexible portions of the compatibalizer molecule. Since the two portions are intended to suspend two different components, perhaps the ester aids in keeping the two portions separate and interactive with their intended component. Perhaps the relatively high polarity of the ester draws the hydroxyl portion (and therefore the prepolymer) into close proximity to the paraffinic portion (and therefore the asphalt), thereby allowing improved intermixing. In any event, ester linkages are preferred within the transition zone between the paraffinic side and semi-polar side but are not preferred as part of either of these two sides. Hence the compatibalizer might be better visualized as having a paraffinic side, a transition portion and a semi-polar side.

Fatty acids are relatively inexpensive and relatively plentiful. Numerous fatty acids were researched, and it was found that they generally provide noteworthy compatibalization (significantly diminish the need for solvent in mixing asphalt and prepolymer). Metal salts of these fatty acids were also tried, using metals such as zinc, and the salts also provided noteworthy compatibalization.

The fatty acids were then reacted with alcohols and compatibalization generally increased. Compatibalization was best when a diol or polyol, particularly a diol, was used to thereby provide a paraffinic chain attached by an ester linkage to a flexible chain having one or more hydroxyl groups. Compatibalization was generally better where only one hydroxyl group existed on the chain, preferrably toward the terminal end of the chain.

Fatty acids were reacted with diols, particularly ethylene glycol and propylene glycol. The best compatibalization was achieved when reacting stearic acid and propylene glycol to produce propylene glycol monostearate. The polystearate version of this molecule, bis stearyl ester polypropylene diol, also provided excellent compatibalization.

Further work was therefore done, and it was found that the paraffinic/semi-polar molecule could be linked with another paraffinic/semi-polar molecule (either the same or different) with an ester, ether or carbon linkage, and the resulting molecule would generally work well as a compatibalizer. However three such molecules linked together generally did not give good compatibalization results.

Polyhydric alcohols were researched, particularly triethylene glycol. Triethylene glycol caprate caprylate and triethylene glycol dipelargonate both provided noteworthy compatibalization, and it is believed that most alcohols reacted with a fatty acid will provide compatibalization, at least to some degree. Polyols with ether groups were reacted with fatty acids and found to also provide exceptional compatibalization.

Having read the present disclosure and with knowledge of the numerous compatibalizers described above, the ordinary artisan should easily be able to develop obvious variations of the preferred compatibalizer of this invention. Depending upon the end-use and performance requirements of the end-product, an obvious variation of the preferred embodiment may be more suitable.

For example, the greater the amount of asphalt to be compatibalized, the more important the paraffinic portion of the compatibalizer. Either the paraffinic chain should be very long or a large number of such chains should be present. If a lesser amount of asphalt is used, the optimal compatibalizer may be primarily dependant upon the semi-polar portion of the compatibalizer. If the prepolymer is substantially non-polar, then the semi-polar portion of the compatibalizer should generally be non-polar. If an increased amount of urethane portions are present or if the prepolymer is rather polar, then more hydroxyl groups may be required or more ether linkages to obtain the optimal compatibalizer.

It would be impossible to test and describe all possible variations of the preferred embodiment with respect to all possible asphalt-prepolymer based materials and such has been left to the skills of the ordinary artisan after having read the present specification.

The compatibalizer preferably is present in the range of about 0.01% to about 5% with 0.1% being most preferred (all percentages herein are weight percentages unless otherwise indicated). Since the optimal compatibalizer and compatibalizer concentration may be dependent upon the end-use application of the asphaltic compound, the optimal compatibalizer and compatibalizer concentration can be determined using ordinary skill and routine experimentation.

The compatibalizer of this invention substantially diminishes the need for a volatile organic solvent, because the fatty acid derivative (or non-derivative) surprisingly provides sufficient miscibility among the material components to form a flowable, sufficiently intermixed system.

The resulting material can be easily blended or mixed and can be pumped, cast as a film, sprayed or injection molded. The resulting asphaltic elastomeric material can be useful as a roofing sealer, highway sealer, automotive undercoat, window mastic, or any one of a number of similar-type applications.

The compatibalizer will not interfere with most chemical reactions commonly used in asphalt systems and can be used in a one part or a two-part asphalt system. Unlike traditional organic solvent compatibalizers which can be an environmental and health hazard, the compatibalizer of the present invention is non-volative and generally relatively non-toxic in comparison to conventionally known compatibalizers.

Curing

The polymerization reaction of the isocyanate prepolymer is commonly referred to as "curing." Prior to curing, the mixture is substantially flowable or moldable, but after curing, the resulting polymer network will generally cause the material to be a non-flowable, non-moldable elastomeric solid.

Curing creates an adhesive bond to most porous contacting surfaces. The sealant properties of the present invention typically perform well, because the asphalt component will generally penetrate into the porous surface upon which it is applied, thereby providing the pre-polymer with a substantial contacting surface upon which to bond as it cures.

The curing reaction is not reversible, and once the material cures, the material is generally no longer flowable or moldable. If the material is used as a sealant, the resulting elastomeric seal (due to curing) is relatively permanent—if the material is pried away and reapplied to a contacting surface, the material will generally have less desirable sealing properties than it had initially (the asphalt may again penetrate into the porous surface but the substantial adhesion created due to the curing reaction is generally lost forever).

Not surprisingly therefore, the asphaltic material of the present invention is preferably stored and transported in its pre-cured state. The mixture is preferably applied and then allowed to cure. Curing can be initiated in a number of ways.

In a one part system, curing is initiated and promulgated by moisture, preferably humidity from the air. As a result, the pre-cured material is generally transported and stored in a substantially water-free environment. When the material is applied and exposed to ambient conditions, the water in the air will react with the prepolymer's isocyanate functional groups, creating an amine (urea) and giving off carbon dioxide as a by-product.

The amine will in turn readily and quickly react with any other isocyanate functional group present. The amine-isocyanate reaction is an addition reaction which links the two prepolymer chains together, creating a disubstituted urea functional group at the connection point of the two prepolymer chains. This curing reaction creates a polymer network within the asphalt which provides strength, cohesion, adhesion and elastomeric properties (the elastomeric properties are due primarily to the urethane groups within the polymer network).

A plethora of other curing reactions could also be used. A secondary curing agent could be added to the one part system which would also react with moisture to create a reaction product (typically an amine) which would initiate and/or promulgate the prepolymer polymerization. Such secondary curing agents are often found to be useful, because the curing reaction does not produce carbon dioxide as a bi-product which may be advantageous for certain applications. Secondary curing agents for one part isocyanate based polymerization reactions are well known in the art, such as oxazolidine or ketimine.

In a two part system, a curative is mixed into the system just prior to application. In such systems, a large number of acceptable curatives are well known in the industry. Acids, amines, hydroxys, or virtually any hydrogen donating molecule can be used to initiate and promulgate the polymerization of an isocyanate prepolymer.

One part systems are generally preferred however, because end-users typically find that mixing prior to application is unduly burdensome, particularly if certain mixing equipment is necessary or if the length of time and quality of mixing has a small margin for error.

Regardless of whether a one part or two part system is used, a large excess of isocyanate will often also create a cross-linked polymer network, because the urethane or disubstituted urea groups (created at the junction point of two prepolymers) can themselves react with isocyanate to form an allophanate (RNHCOHR'COOR') in the case of a urethane reaction or a substituted biuret (RNHCONR'CONHR") in the case of a disubstituted urea reaction.

Other Additives

Other additives can be added to fine tune the physical properties of the resulting compound. Optional ingredients which can be used include for example, those catalysts (i e. imidizole tin or other known metal catalysts), fillers and additives conventionally used in asphaltic materials or isocyanate based polymers, such as antioxidants, protectants and the like. If the curing reaction gives off carbon dioxide (as when water reacts with an isocyanate functional group), an absorbent can be used, such as molecular sieve, to absorb the carbon dioxide, thereby substantially preventing unwanted bubbles or the like which may occur with the evolution of gases during curing.

Preferred fillers would include organoclays. Such fillers preferably comprise a bentonite clay or hectorite clay platelet having long chain organic compounds bonded to its two faces. When used as a filler and when the system is at rest, the organoclay's long chain components will agglomerate, making the system thick and solid-like. However, when a shearing force is applied, such as when the material is moved and/or applied, the long chain components will disperse, creating an emulsion which will aid in the flow properties of the material (the organoclay will no longer thicken the material unless or until it once again comes to a rest and the long chain components once again agglomerate). Such fillers allow for easy application since they do not substantially impede the flow capabilities of the compound while the compound is being applied, and such fillers also thicken the material once it comes to rest, thereby substantially preventing the material from flowing away from the area to which it was applied.

Other possible additives would include those modifiers and additives conventionally used in the formation of natural and synthetic elastomers. Such additives include flame retardants, reinforcements (both particulate and fibrous) heavy and light fillers, UV stabilizers, blowing agents, perfumants, antistats, insecticides, bacteriostats, fugicides, surfactants, and the like. Additionally, it should be recognized that additional conventional elastomers can be included as an ingredient in forming the asphalt material of this invention. Such additional elastomers include for example, polysulfide, EPDM, EPR ethylene, propylene diene monomer, ethylene propylene terpolymer, polychlorobutadiene, styrene-butadiene rubber, nitrile rubber, and the like.

The Final Product

The resulting material is free of solvent evaporation stress (i.e. cracking, blistering and the like) common to many asphalt adhesive systems. The compatibalizer also surprisingly enhanced the resulting asphalt compounds "green strength"—that is, the ability of the asphalt compound to be tacky and to adhere during the transition period between the cured and uncured states. The high green strength of the present invention is advantageous, because the compound generally can be used without the need for clamps or similar-type devices since the material will adhere and bond virtually on contact. The adherence and bonding will increase as the curing progresses.

Preferred Method of Manufacturing

A one step system is preferred since it eliminates the need for two-component mixing just prior to application, and the preferred method of manufacturing the one-step system is as follows:

1. The prepolymer is mixed at a slightly elevated temperature (140–190° F.) in a substantially water-free environment and comprises (in weight parts of final material, not weight parts of prepolymer material):

(a) about 20 to about 75 weight parts, and most preferably about 34 weight parts of about 2000 equivalent weight polyol;

(b) about 2 to about 15 weight parts, and most preferably 7 weight parts non-reactive dilutent, preferably plasticizer;

(c) about 2 to about 20 weight parts and most preferably about 7 weight parts of about 150 equivalent weight diisocyanate; and (d) a trace amount of catalyst (preferably tin) preferably at least about 0.01 weight parts.

2. The prepolymer preferably comprises about 20 to about 90 weight parts, preferably about 50 weight parts of the final material. The prepolymer is set aside and not used until step 10 below.

3. The asphalt component is heated in a substantially water free environment to its softening point or until it is substantially a fluid. The amount of asphalt is preferably about 10 to about 80 weight parts, most preferably 38 weight parts. The asphalt should be continually heated to its softening point in a substantially water-free environment throughout the following manufacturing steps.

4. The non-reactive dilutents (most preferably plasticizer(s)) are added to the heated asphalt. The amount of non-reactive dilutents is preferably about 2 to about 20 weight parts, most preferably about 9 weight parts.

5. The blocking agent, preferably an anhydride, isocyanate or carbodiamide, is added. The preferred amount of blocking agent is about 0.2 to about 5 weight parts, most preferably about 0.6 weight parts.

6. The materials are mixed until all materials are dispersed or dissolved.

7. A catalyst is added (preferably tin, imidizole, or other metal catalyst). The preferred amount of catalyst is at least about 0.1 parts per million;

8. Mixing is continued and any desired additives are added (thickeners, thixotropes, antioxidants and protectants). The preferred amount of additives is about 2 to about 25 weight parts.

9. The compatibilizer is then added. The preferred amount of compatibalizer is at least about 0.01 weight parts, most preferably about 0.05 weight parts.

10. The prepolymer is added and the mixing is continued until all materials are dispersed or dissolved.

11. Allow the mixture to cool and store in a substantially water-free environment.

EXAMPLES

1. The prepolymer was mixed at room temperature in a substantially water-free environment and comprises (in weight parts of final material, not weight parts of prepolymer material):

(a) 34 weight parts of a 2000 equivalent weight polyether triol;

(b) 7 weight parts butyl benzyl phthalate;

(c) 7 weight parts of diphenyl methane diisocyanate; and (d) a trace amount of tin catalyst, about 1 ppm.

2. The prepolymer was set aside in a substantially water-free environment and not used until step 10 below.

3. 38 weight parts of industrial grade asphalt was heated in a substantially water free environment to its softening point. The asphalt was continually heated and mixed at its softening point in a substantially water-free environment throughout the following manufacturing steps.

4. About 9 weight parts of butyl benzyl phthalate was added to the heated asphalt.

5. 0.6 weight parts of maleic anhydride was then added to the heated asphalt.

6. The asphalt mixture was mixed for about 30 minutes until all materials were dispersed or dissolved.

7. A trace amount of tin catalyst was then added, about 0.05 weight parts, and the asphalt was mixed for about 2 hours;

8. 1 weight part of a precipitated silica thixotrope filler and about 4 weight parts of a calcium carbonate particle filler was then added.

9. 0.05 weight parts of propylene glycol monostearate was then added.

10. The asphalt was mixed until all the materials were dispersed or dissolved and then the prepolymer was added and mixed about 30 minutes until all materials are dispersed or dissolved.

11. The final mixture was allowed to cool and was stored in a substantially water-free environment.

The above mixture was tested and found to properly cure overnight to a commercially acceptable elastomer under most common outdoor weather conditions. The overnight relative humidity can be as low as about 30% and the overnight temperature can be as low as about 0° F. and the material will properly cure in about 10 to about 20 hours. At higher temperatures and relative humidities, the material will cure much more quickly.

The amount of cure time can be adjusted by increasing or decreasing the amount of catalyst in the formulation or by adding an intermediate water curing component in place of the catalyst, such as oxazolidine or ketimine. The oxazolidine or ketimine can be added in place of the catalyst in an amount of about 0.1 to about 2 weight parts, preferably about 0.5.

Upon curing, the resulting product of Example 1 had excellent peel adhesion, tensile adhesion and lap shear. The material was very durable and water and weather resistant and would conceivably work very well as a roofing adhesive or the like.

Alternatively, a two-part adhesive can be manufactured wherein the above material is mixed with an amine or other hydrogen donating compound just prior to application. The amine will react with the prepolymer typically much more readily than will water. As a result, the material will cure much more quickly and will not significantly react with water (and therefore will not significantly give off carbon dioxide as a by-product).

Alternatively, a blocking group can be incorporated onto the isocyanate functional groups so that the material will not react with water. A curative can then be mixed with the material just prior to application which will remove the blocking group and initiate and/or promulgate curing.

The chemistry relating to polymerization of isocyanate prepolymers is well developed and a full discussion of one component and two component curing systems would be so voluminous as to be inappropriate in light of the fact that the present invention is not directed to any particular curing system, but rather to an innovative compatibilizer. Such an exhaustive discussion of curing systems therefore is unnecessary and may obscure the present invention. Such curing systems are readily known or can be readily developed by an ordinary artisan, using routine experimentation and knowledge well known in the art.

The above discussion has been provided to aid in the understanding of the present invention. Details provided above are provided primarily to help the ordinary artisan visualize the preferred embodiment and the innumerable other possible embodiments of this invention, and such details are not intended to create any limitations to this invention. Many improvements and modifications are certainly possible and it would be impossible to explicitly describe every conceivable aspect of the present invention. Therefore, the failure to describe any such aspect is also not intended to create any limitation to the present invention. The limitations of the present invention are defined exclusively in the following claims and nothing within this specification is intended to provide any further limitation thereto.

What is claimed is:

1. A substantially solvent-free asphalt based material comprising:
   about 15 to about 75 weight parts asphalt;
   a compatibalizing agent in an amount greater than about 0.01 weight parts, wherein the amount of compatiblizing agent is not so great as to be capable of dissolving the asphalt;
   about 25 to 75 weight parts polyurethane prepolymer in its cured or uncured states; wherein said compatiblizing agent comprises a polymeric material comprising:
   a polymer unit, or two such units being either identical or different and linked together by an ester, carbon or ether bond, said unit having the following formula:

$$CH_3-(C_nH_{2n})-R_1$$

wherein:
   n is 4 or more, and
   $R_1$ is COOH, COO$^-$M$^+$, COOR$_2$ or R$_2$,
   wherein:
   M is a metal other than lead, cobalt, tin zirconium or titanium, and R$_2$ is a substantially saturated organic chain ahving a backbone substantially comprising carbon-carbon, carbon-oxygen, or carbon-nitrogen linkages, or combinations thereof, wherein the backbone's pendant constituents are either —H or —OH and wherein at least one pendant constituent is —OH.

2. The material of claim 1 wherein n is 12 or more, and $R_1$ is COOR$_2$.

3. The material of claim 2 wherein the compatibalizer is propylene glycol monostearate, bis stearyl ester polypropylene diol, ethylene glycol monostearate, triethylene glycol caprate caprylate triethylene glycol dipelargonate, or combinations thereof.

4. The material of claim 3 wherein the prepolymer comprises:
   about 25 to about 65 weight percent polyol,
   about 5 to about 20 weight percent plasticizer, and
   about 5 to about 20 weight percent diisocyanate.

5. A method of compatiblizing an asphalt material with a polyurethane prepolymer, said method comprising:
   combining about 15 to 75 weight parts asphalt material with at least about 0.01 weight parts compatibilizing agent, wherein the amount of compatabilizing agent is not so great as to dissolve the asphalt
   said compatiblizing agent comprising a polymer unit, or two such units being either identical or different and linked together by an ester, carbon or ether bond, said unit having the following formula:

$$CH_3-(C_nH_{2n})-R_1$$

wherein:
   n is 4 or more, and
   $R_1$ is COOH, COO$^-$M$^+$, COOR$_2$ or R$_2$,
   wherein:
   M is a metal other than lead, cobalt, tin, zirconium or titanium, and
   R$_2$ is a substantially saturated organic chain having a backbone substantially comprising carbon-carbon, carbon-oxygen, or carbon-nitrogen linkages, or combinations thereof, wherein the backbone's pendent constituents are either —H or —OH and wherein at least and combining said prepolymer one pendent constitutent is —OH.

* * * * *